US012560900B2

(12) United States Patent (10) Patent No.: US 12,560,900 B2
Stromberg (45) Date of Patent: Feb. 24, 2026

(54) CAN BUS ADAPTER FOR REFRIGERATION SYSTEM

(71) Applicant: Carrier Corporation, Palm Beach Gardens, FL (US)

(72) Inventor: Tracy Stromberg, Salem, SD (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 479 days.

(21) Appl. No.: 17/900,187

(22) Filed: Aug. 31, 2022

(65) Prior Publication Data

US 2023/0077078 A1 Mar. 9, 2023

Related U.S. Application Data

(60) Provisional application No. 63/241,318, filed on Sep. 7, 2021.

(51) Int. Cl.
| | |
|---|---|
| *G05B 19/042* | (2006.01) |
| *F25D 11/00* | (2006.01) |
| *F25D 29/00* | (2006.01) |
| *H01R 31/06* | (2006.01) |

(52) U.S. Cl.
CPC .......... *G05B 19/042* (2013.01); *F25D 11/003* (2013.01); *F25D 29/005* (2013.01); *G05B 2219/2654* (2013.01)

(58) Field of Classification Search
CPC .......... G05B 19/042; G05B 2219/2654; F25D 11/003; F25D 29/005; B60H 1/00364; B60H 1/00642; B60H 1/3232; H04L 67/12; H01R 31/06

USPC .......................................................... 700/300
See application file for complete search history.

(56) References Cited

U.S. PATENT DOCUMENTS

| | | | |
|---|---|---|---|
| 5,121,854 A | 6/1992 | Trouteaud et al. | |
| 8,818,612 B2 * | 8/2014 | Das .......................... | G07C 7/00 |
| | | | 701/32.7 |
| 9,649,911 B2 * | 5/2017 | Abbott .................. | F25D 11/003 |
| 10,924,331 B2 | 2/2021 | Huang et al. | |
| 2005/0092287 A1 | 5/2005 | Tozzi et al. | |
| 2013/0144442 A1 | 6/2013 | Dudley et al. | |
| 2020/0109651 A1 | 4/2020 | Wang et al. | |

(Continued)

FOREIGN PATENT DOCUMENTS

| | | |
|---|---|---|
| CN | 102490669 A | 6/2012 |
| CN | 202345583 U | 7/2012 |

(Continued)

OTHER PUBLICATIONS

Extended European Search Report for European Application No. 22194397.0; Report Mail Date May 22, 2023 (12 Pages).

(Continued)

*Primary Examiner* — Michael J Brown
(74) *Attorney, Agent, or Firm* — CANTOR COLBURN LLP

(57) ABSTRACT

An adapter for connecting a portable device to a control system of a transport refrigeration system includes a cable having a first end and a second end. A first connector is arranged at the first end of the cable and a second connector is arranged at the second end of the cable. The first connector is connectable to the portable device and the second connector is receivable within a port of the control system.

7 Claims, 6 Drawing Sheets

(56)        References Cited

U.S. PATENT DOCUMENTS

| 2021/0138877 | A1 | 5/2021 | Ducher |
| 2021/0199358 | A1 | 7/2021 | Mi et al. |
| 2022/0196306 | A1* | 6/2022 | Grinshtain ............ F25D 29/003 |

FOREIGN PATENT DOCUMENTS

| CN | 102998355 | A | 3/2013 |
| CN | 202974937 | U | 6/2013 |
| CN | 203911182 | U | 10/2014 |
| CN | 207925845 | U | 9/2018 |
| CN | 208707038 | U | 4/2019 |
| CN | 208903247 | U | 5/2019 |
| DE | 102011051758 | A1 | 1/2013 |
| EP | 0890937 | A2 | 1/1999 |
| EP | 1189393 | B1 | 3/2002 |
| WO | 2006005628 | A2 | 1/2006 |

OTHER PUBLICATIONS

Partial Extended European Search Report for European Application No. 22194397.0; Report Mail Date Jan. 30, 2023 (pp. 1-12).

* cited by examiner

CAN BUS ADAPTER FOR REFRIGERATION SYSTEM

CROSS-REFERENCE TO RELATED APPLICATIONS

This application claims the benefit of U.S. Provisional Application No. 63/241,318 filed Sep. 7, 2021, the disclosure of which is incorporated herein by reference in its entirety.

BACKGROUND

Exemplary embodiments of the present disclosure relate to transport refrigeration systems and more particularly to a cable for accessing real time information from a control system of the transport refrigeration system.

Fruits, vegetables and other perishable items, including meat, poultry and fish, fresh or frozen, are commonly transported in the cargo box of a truck or trailer, or in an intermodal container, collectively referred to herein as a container. According, it is customary to provide a transport refrigeration system in operative association with the container for cooling the atmosphere within the container. The transport refrigeration system typically includes a compressor, a condenser, an expansion device and an evaporator serially connected by refrigerant lines in a closed refrigerant circuit. The compressor of the transport refrigeration system is typically driven by the engine shaft either through a belt drive or by mechanical shaft-to-shaft link (although on-board generators may be used in certain instances).

During transport of such perishable items, the temperature within the container must be maintained within strict temperature limits associated with the particular items being transported, regardless of potentially severe operating conditions imposed by the local environment in which the system is operating. Currently, pico scopes or recorders are used to collect data and troubleshoot operation of a transport refrigeration system. However, use of such devices and the corresponding evaluation of the collected data is time consuming Additionally, although the controller area network bus of a transport refrigeration system is accessible via a break out box, such a break out box is not directly connectable to the network. Further, the information that may be collected in such a manner is limited.

BRIEF DESCRIPTION

According to an embodiment, an adapter for connecting a portable device to a control system of a transport refrigeration system includes a cable having a first end and a second end. A first connector is arranged at the first end of the cable and a second connector is arranged at the second end of the cable. The first connector is connectable to the portable device and the second connector is receivable within a port of the control system.

In addition to one or more of the features described above, or as an alternative to any of the foregoing embodiments the port of the control system is an engine emission system port.

In addition to one or more of the features described above, or as an alternative to any of the foregoing embodiments the first connector is a nine pin serial male or a nine pin serial female.

In addition to one or more of the features described above, or as an alternative to any of the foregoing embodiments when the second connector is coupled to the port of the control system, the second connector is operably coupled to an interface bus of the control system.

In addition to one or more of the features described above, or as an alternative to any of the foregoing embodiments the interface bus is a controller area network bus.

According to an embodiment, a transport refrigeration system is provided including control system a control system operable to monitor and control operation of at least one component of the transport refrigeration system. The control system includes an interface bus having at least one port. At least one module is connected to the interface bus via the at least one port. The at least one module includes a portable device directly connected to the interface bus via an adapter.

In addition to one or more of the features described above, or as an alternative to any of the foregoing embodiments the adapter further comprises a cable having a first end and a second end and a first connector arranged at the first end of the cable and a second connector arranged at the second end of the cable, the first connector being coupled to the portable device.

In addition to one or more of the features described above, or as an alternative to any of the foregoing embodiments the first connector is one of a nine pin serial male and a nine pin serial female.

In addition to one or more of the features described above, or as an alternative to any of the foregoing embodiments the at least one port includes an engine emission system port, the second connector being connectable to the engine emission system port.

In addition to one or more of the features described above, or as an alternative to any of the foregoing embodiments the second connector is interchangeable with an engine emission system plug and an engine emission system cap.

In addition to one or more of the features described above, or as an alternative to any of the foregoing embodiments the interface bus is a controller area network bus.

In addition to one or more of the features described above, or as an alternative to any of the foregoing embodiments the portable device is a controller area network reader.

In addition to one or more of the features described above, or as an alternative to any of the foregoing embodiments the portable device is a piece of equipment capable of running a diagnostic and/or prognostic software.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
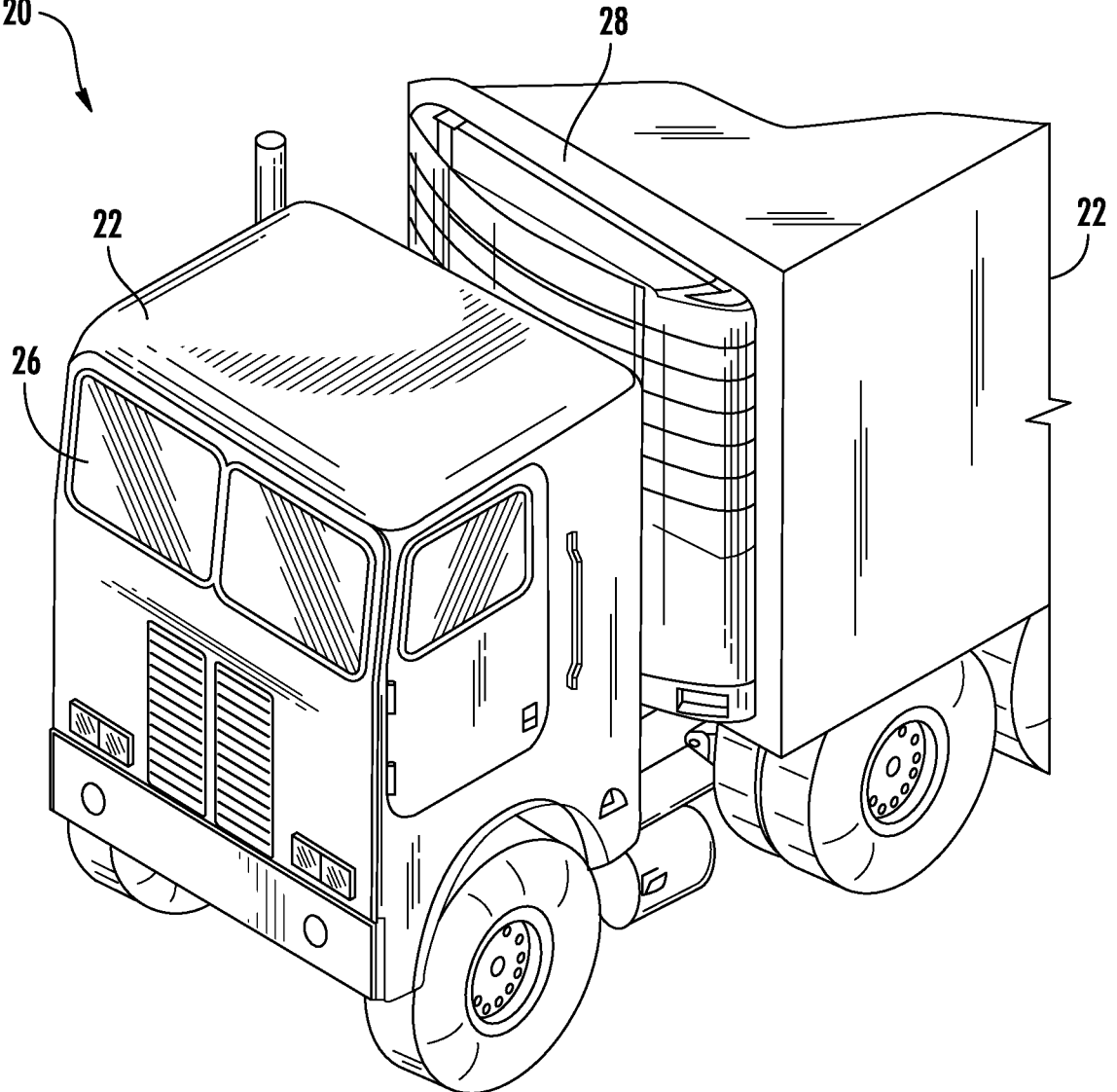
FIG. 1 is an illustration of an exemplary transport refrigeration system.

With reference now to FIG. 1, an example of a transport refrigeration system 20 is illustrated. As shown, the transport refrigeration system 20 is associated with a container or trailer 22 that is towed or otherwise transported by a tractor 24 including an operator's compartment or cab 26. The transport refrigeration system 20 is able to heat and cool the cargo area of trailer 22, completely by itself, excluding the fuel tank located at the bottom of the trailer 22. As shown, the transport refrigeration system 20 is typically mounted at the front wall 28 of the trailer 22. Although the transport refrigeration system 20 is illustrated as being mounted to the trailer 22, it should be appreciated by those of skill in the art that embodiments described herein may be applied to any transport refrigeration system such as, for example shipping containers that are shipped by rail or sea (via a watercraft).

Figure 2:
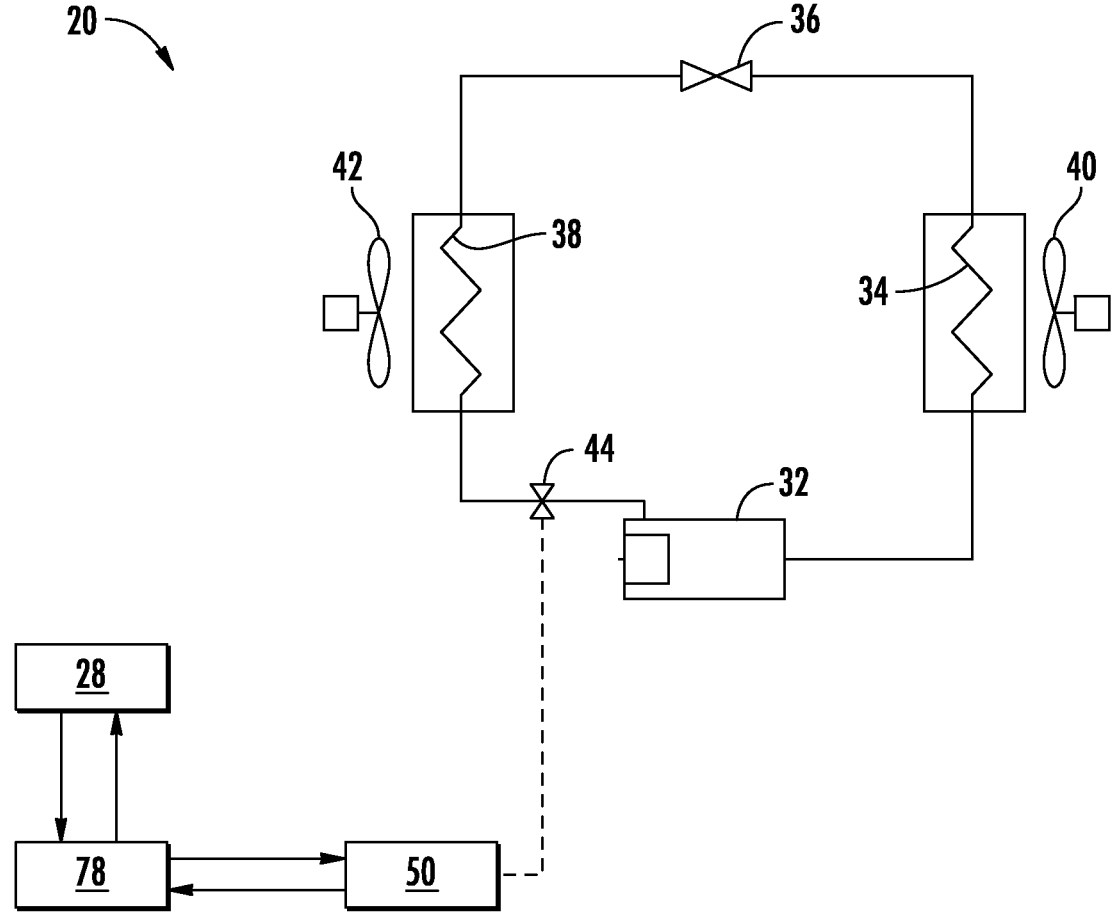
FIG. 2 is a schematic diagram of an exemplary transport refrigeration system according to an embodiment.

With reference to FIG. 2, an exemplary embodiment of the transport refrigeration system 20 for cooling the atmosphere within the trailer 22 is illustrated. As shown, the transport refrigeration system 20 includes a compressor 32, a heat rejection heat exchanger 34 (i.e., condenser), an expansion device 36, and a heat absorption heat exchanger 38 (i.e., evaporator) fluidly connected in a closed loop refrigerant circuit and arranged in a conventional refrigeration cycle. A condenser fan 40 is configured to move a flow of air across an exterior of the condenser heat exchanger 34, and an evaporator fan 42 may be used to drive a flow of fluid across an exterior of the evaporator heat exchanger 38.

As in conventional practice, when the transport refrigerant system 20 is operating in a cooling mode, low temperature, low pressure refrigerant vapor is compressed by the compressor 32 to a high pressure, high temperature refrigerant vapor and passed from the discharge outlet of the compressor 32 to circulate through the refrigerant circuit to return to the suction inlet of the compressor 32. The high temperature, high pressure refrigerant vapor passes into and through the heat exchange tube coil or tube bank of the condenser heat exchanger 34, wherein the refrigerant vapor condenses to a liquid. Downstream from the heat rejection heat exchanger 34, the refrigerant is provided the expansion device 36 before passing through the evaporator heat exchanger 38. In traversing the expansion device 36, which may be an electronic expansion valve ("EXV") or a mechanical thermostatic expansion valve ("TXV"), the liquid refrigerant is expanded to a lower temperature and lower pressure prior to passing to the evaporator heat exchanger 38.

In flowing through the heat exchange tube coil or tube bank of the evaporator heat exchanger 38, the refrigerant evaporates, and is typically superheated, as it passes in heat exchange relationship return air drawn from the cargo space of the trailer 22 passing through the airside pass of the evaporator heat exchanger 38. Before entering the suction inlet of the compressor 22, the refrigerant vapor may be configured to pass through a suction modulation valve 44 disposed downstream with respect to refrigerant flow of the of the evaporator heat exchanger 38 and upstream with respect to refrigerant flow of the suction inlet of the compressor 32.

The transportation refrigeration system 20 may additionally include a refrigeration unit controller 50 configured to control operation of the suction modulation valve 44 and selectively modulate the open flow area through the suction modulation valve 44 so as to regulate the flow of refrigerant passing through the suction modulation valve to the suction inlet of the compressor 32. By selectively reducing the open flow area through the suction modulation valve 44 the refrigeration unit controller 50 can selectively restrict the flow of refrigerant vapor supplied to the compressor 32, thereby reducing the capacity output of the transport refrigeration system 20 and in turn reducing the power demand imposed on the engine 28. It should be understood that a simplified transport refrigeration system 20 has been illustrated and described herein and that embodiments where the transport refrigeration system 20 includes additional components, such as a receiver, economizer, and/or subcooler for example, are also within the scope of the disclosure.

Air drawn from within the trailer 22 by the evaporator fan(s) 44 associated with the evaporator heat exchanger 38, is passed over the external heat transfer surface of the heat exchange tube coil or tube bank of the evaporator heat exchanger 38 in heat exchange relationship with refrigerant passing through the tubes of the evaporator heat exchanger 38, whereby the air is cooled. The cooled air is circulated back into the interior space of the trailer 22 to maintain the cargo box temperature within a preset relatively narrow range of at a required box temperature for the particular perishable goods stowed within the cargo box. The air drawn from the cargo box is referred to as "return air" and the air circulated back to the cargo box is referred to as "supply air". It is to be understood that the term "air' as used herein includes mixtures of air and other gases, such as for example, but not limited to nitrogen or carbon dioxide, sometimes introduced into a refrigerated cargo box for transport of perishable product such as produce.

As noted previously, the transport refrigeration system 20 includes an electronic refrigeration unit controller 50 that is configured to operate the transport refrigeration system 20 to maintain a predetermined thermal environment within the interior of the trailer 22 wherein the product is stored during transport. The refrigeration unit controller 50 maintains the predetermined thermal environment by selectively activating and deactivating the various components of the refrigerant vapor compression system, including the compressor 32, the fan(s) 40 associated with the condenser heat exchanger 34, the fan(s) 44 associated with the evaporator heat exchanger 38, and various valves in the refrigerant circuit, including but not limited to the suction modulation valve 52, to selectively vary the refrigeration load capacity of the transport refrigeration system 20.

In one embodiment, the refrigeration unit controller 50 includes a microprocessor and an associated memory. The memory of the refrigeration unit controller 50 may be programmed to contain preselected operator or owner desired values for various operating parameters within the system. The programming of the controller is within the ordinary skill in the art. The refrigeration unit controller 50 may include a microprocessor board that includes the microprocessor, an associated memory, and an input/output board that contains an analog-to-digital converter which receives temperature inputs and pressure inputs from a plurality of sensors located at various points throughout the refrigerant circuit and the refrigerated cargo box, current inputs, voltage inputs, and humidity levels. The input/output board may also include drive circuits or field effect transistors and relays which receive signals or current from the refrigeration unit controller 50 and in turn control various external or peripheral devices associated with the transport refrigeration system. The particular type and design of the refrigeration unit controller 50 is within the discretion of one of ordinary skill in the art to select and is not limiting of the invention.

Figure 3:
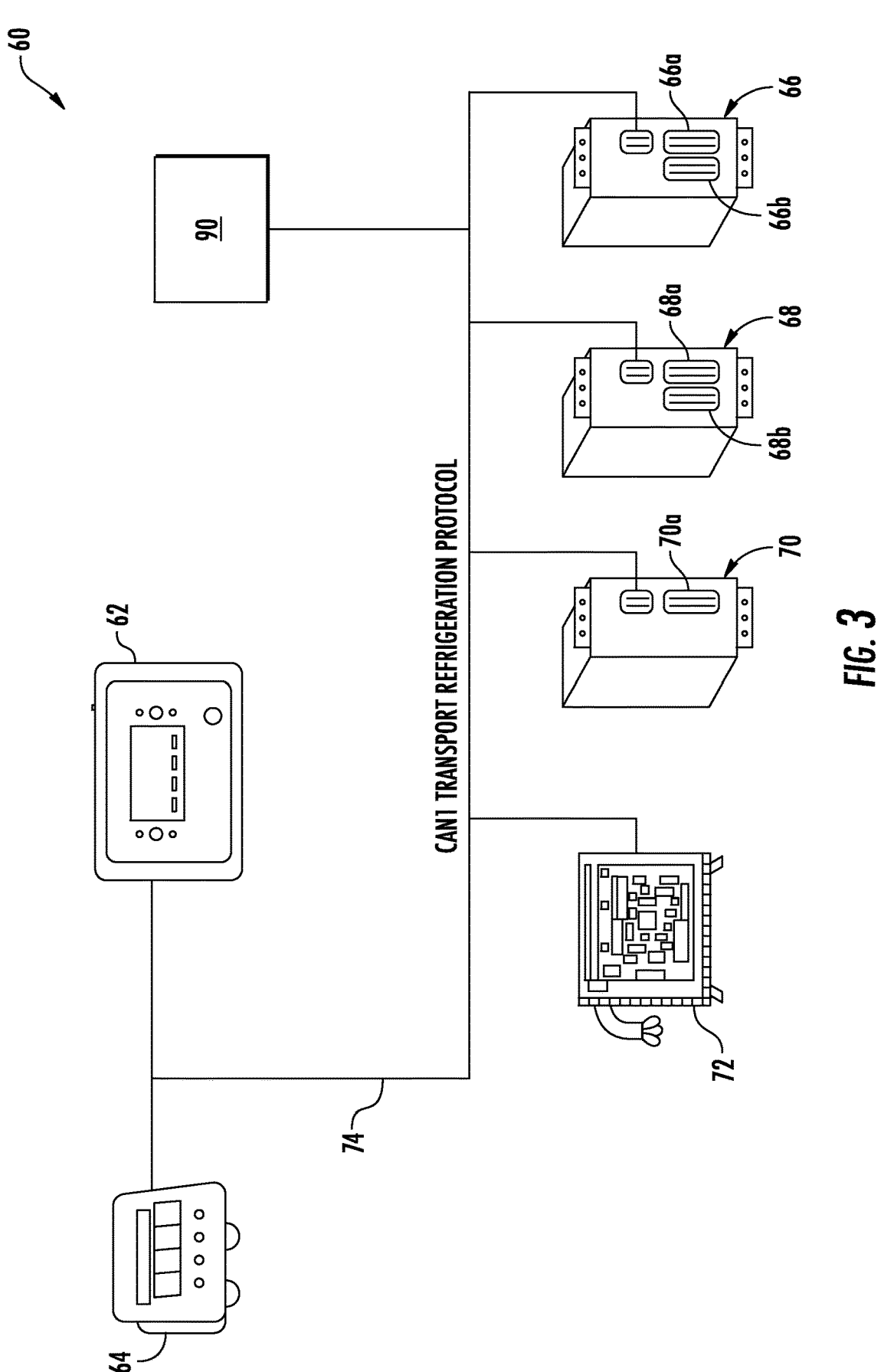
FIG. 3 is a schematic diagram of an exemplary control system of the transport refrigeration system according to an embodiment.

With reference now to FIG. 3, an example of a control system 60 operable to monitor and control operation of the components of the transport refrigeration system 20 is provided. As shown, the control system 60 may include a general user interface 62, such as a graphic user interface (GUI), a power control module (PCM) 64, and at least one module, such as a first module 66, a second module 68, a third module 70, and a fourth module 72. It should be understood that although the control system 60 is illustrated as having four modules, embodiments where the control system 60 has fewer than four modules, such as two modules, or three modules for example, or alternatively, more than four modules are also within the scope of the disclosure. In an embodiment, the electronic refrigeration unit controller 50 is part of the control system 60 of the transport refrigeration system 20; for example, the first module 66 of FIG. 3 may include the electronic refrigeration unit controller 50.

Each of the modules 66, 68, 70, and 72 may include at least one input connector (a) and/or at least one output connector (b). It should be understood that each module may include more than one input and output connector. Each input connector (a) may be keyed to accept an input functional device, and each output connector (b) may be keyed to accept an output functional device. Furthermore, it should be understood that each input connector (a) may be keyed to accept multiple input functional devices, and each output connector (b) may be keyed to accept multiple output functional devices. In an embodiment, one or more of the modules 66, 68, 70, 72 has enhanced diagnostic capabilities to identify if each module may be operating properly and if there is a problem, determine if the problem may be internal or external to the module.

An interface bus 74 may operatively couple the components 62, 64, and/or modules 66, 68, 70, 72 of the control system 60. One or more of the plurality of modules 66, 68, 70, 72 is connectable to the CAN bus 74 via a port. Further, the interface bus 74 may include a power and ground wire for distributing power from the power control module 64 to the various modules 62, 66, 68, 70, and 72 connected to the interface bus 74. In an embodiment, the interface bus 74 includes a controller area network (CAN) bus for the modules 66, 68, 70, and 72 to communicate with each other. The CAN bus 74 may form a daisy chain that allows for direct and sequential communication between the modules 66, 68, 70, 72 without a host computer.

Figure 4:
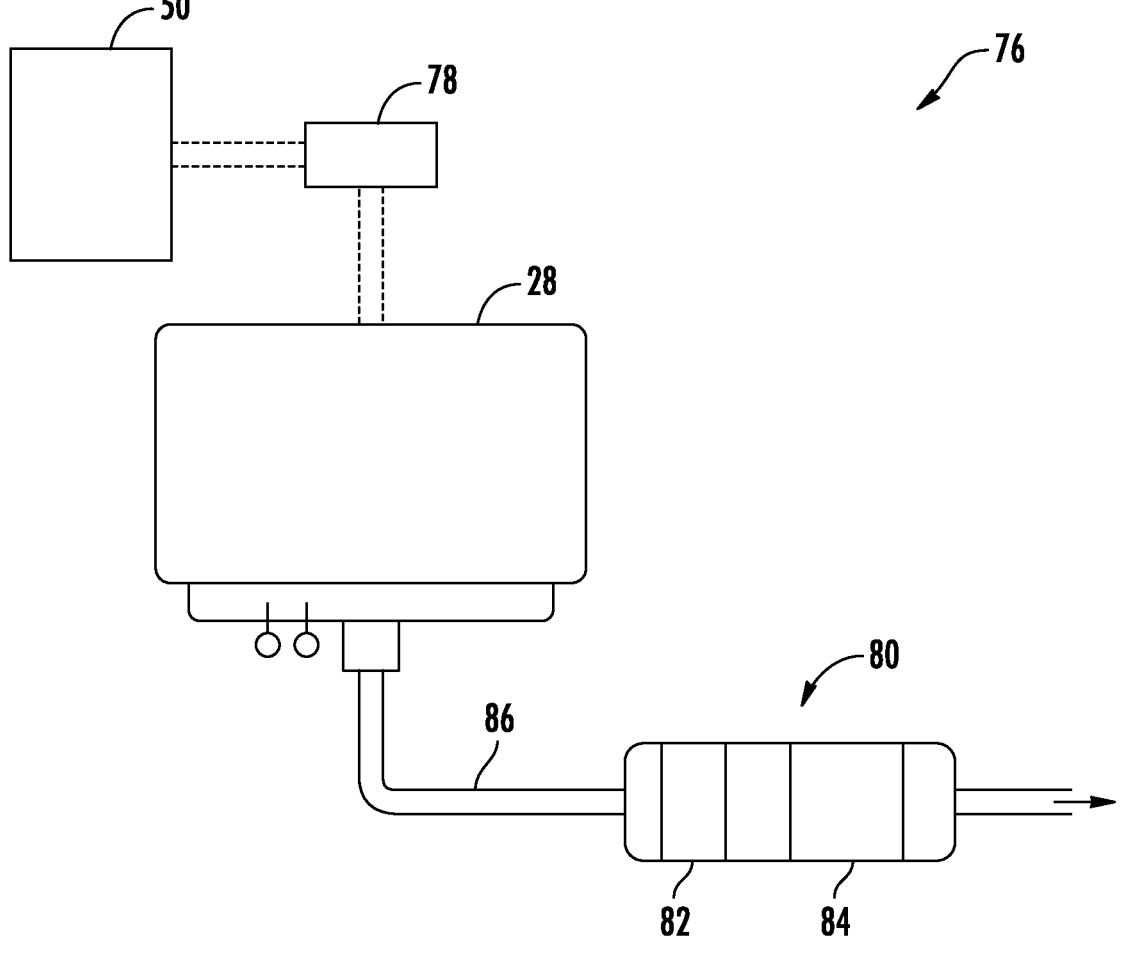
FIG. 4 is a schematic diagram of an exemplary engine emission system according to an embodiment.

With reference now to FIG. 4, the transport refrigeration system 20 may include an engine emission system 76 including an exhaust treatment unit 80 having a diesel oxidation catalyst (DOC) 82 and a diesel particulate filter (DPF) 84 provided along the exhaust flow path, such as in-line with an exhaust pipe 86. The DOC 82 is configured to break down exhaust pollutants into less harmful substances, such as carbon dioxide and water for example, and the DPF 84 is configured to remove the particulates from the exhaust gas prior to the exhaust gas reaching the ambient atmosphere. In an embodiment, the engine emission system 76 is operable to clean the exhaust flow path, such as by periodically cleaning the DPF 84 to remove accumulated soot and particles therefrom.

Figure 5:
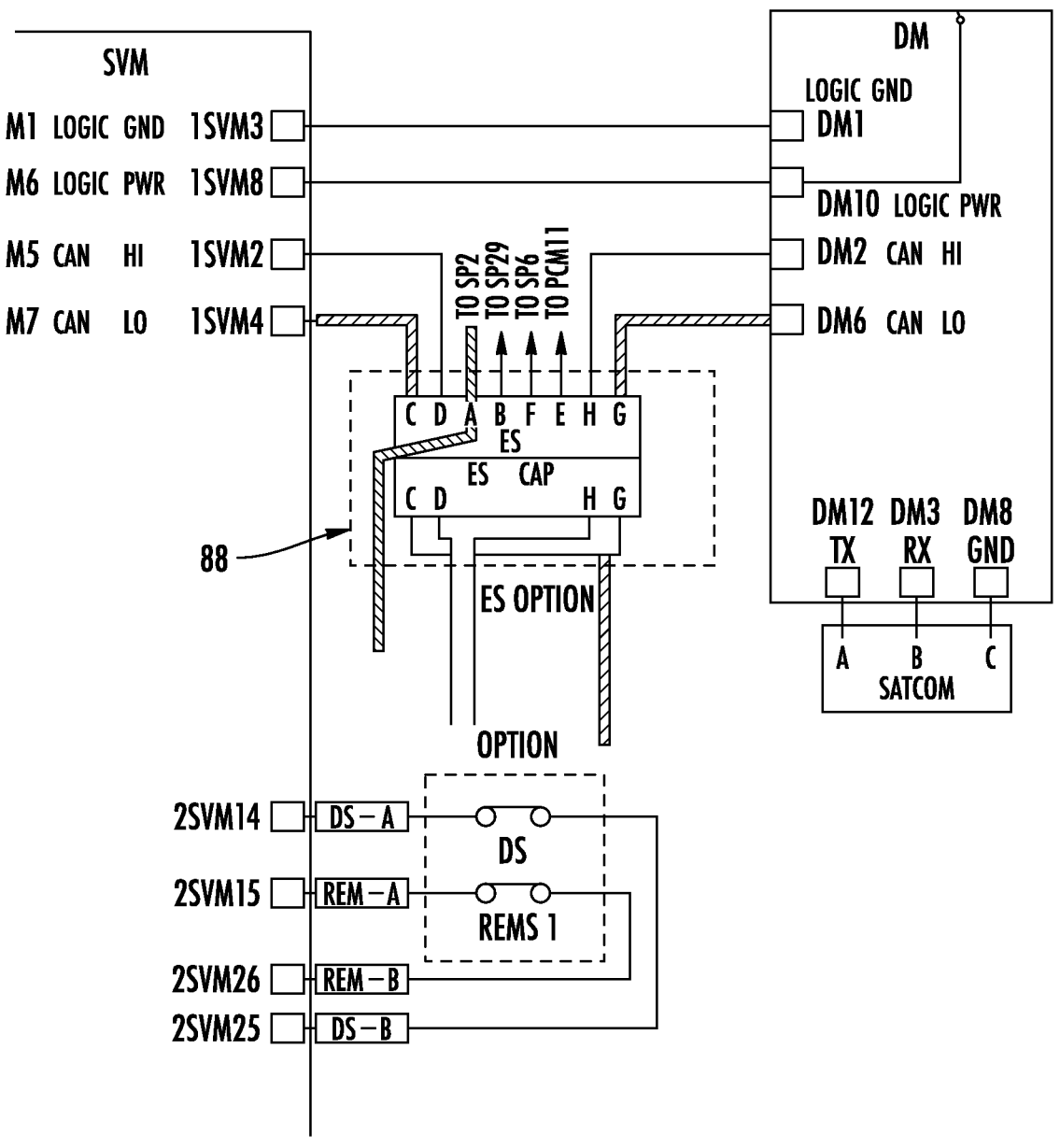
FIG. 5 is an exemplary wire diagram of a portion of the control system of the transport refrigeration system according to an embodiment.

In an embodiment, an engine emission system 76 including an electronic engine controller 78 is optionally connectable to the CAN bus 74 as one of the plurality of modules. Accordingly, the engine controller 78 may be operably coupled to the refrigeration unit controller 50 via the CAN bus 74. The engine controller 78 is configured to initiate a cleaning operation in response to one or more monitored characteristics within the engine emission system. The engine emission system 76 is connectable to the CAN bus 74 using an engine emission system plug receivable within a corresponding engine emission system port 88, best shown in FIG. 5. Because the engine emission system 76 is optional, in instances where the transport refrigeration system 20 does not include an engine emission system 76, a cap (not shown) may be installed or coupled to the engine emission system port 88. The cap may include one or more wires configured to complete the daisy chain of the CAN bus 74 when installed within the engine emission system port 88.

Figure 6:
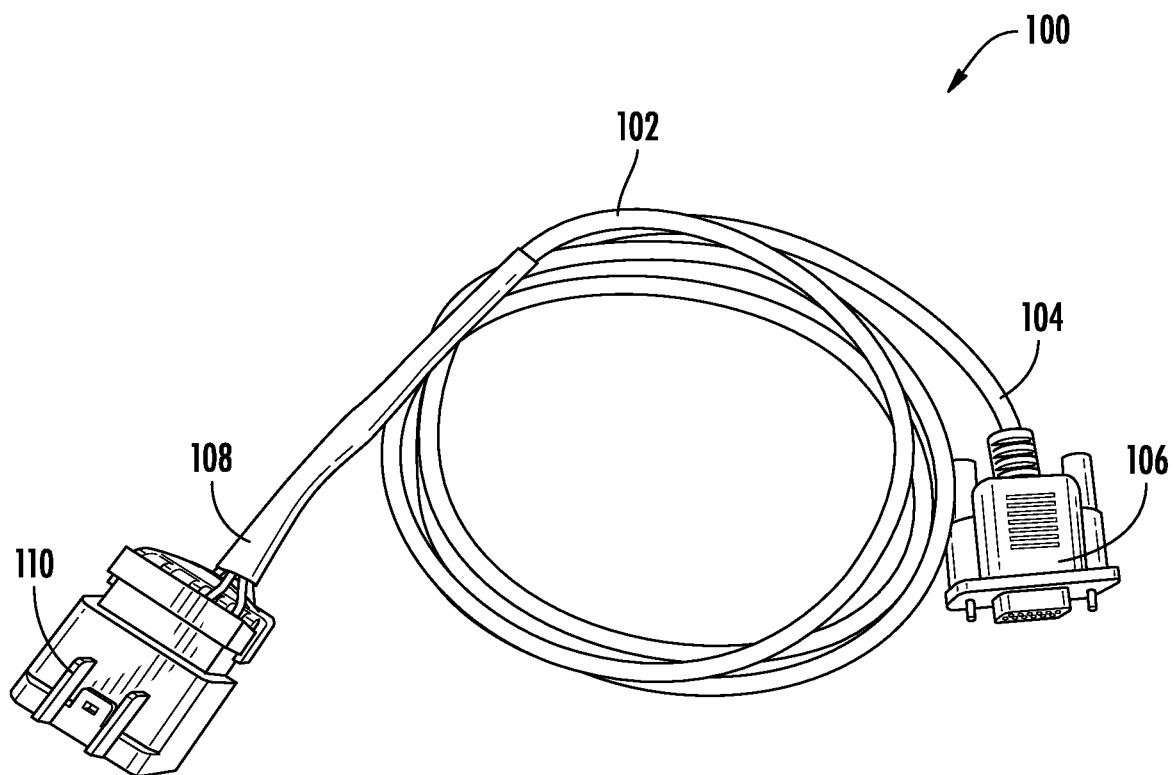
FIG. 6 is perspective view of an exemplary adapter for connecting a portable device to the interface bus of the control system according to an embodiment.

To monitor operation of the transport refrigeration system 20, a portable device 90, such as a laptop, CAN reader, or another piece of equipment capable of running a diagnostic and/or prognostic software may be directly connected to the CAN bus 74 in a manner similar to a module. In an embodiment, a CAN adapter 100 is used to connect the portable device 90 to the CAN bus 74. An example of a CAN adapter 100 is shown in more detail in FIG. 6. The CAN adapter 100 includes a cable 102 having a first connector 106 at a first end 104 thereof and a second connector 110 at a second, opposite end 108 thereof. The first connector 106 is a plug corresponding to a port formed on one or more types of portable devices 90. In an embodiment, the first connector 106 is a standard nine pin serial male receivable within a corresponding nine pin serial female port or coupler. However, embodiments where the portable device includes the serial male and the first connector 106 is the female, as well as other suitable connectors, are also within the scope of the disclosure.

The second connector 110 may be receivable within the same port configured to receive the engine emission system 76. In an embodiment, the second connector 110 arranged at the second end 108 of the cable 102 is complementary to and receivable within the engine emission system port 88. Similar to the engine emission system cap, the second connector 110 may include a plurality of wires configured to complete the daisy chain of the CAN bus 74 when installed within the engine emission system port 88. Accordingly, the second connector 110 is interchangeable with the engine emission system cap and the engine emission system plug.

The adapter 100 having a first and second connectors 104, 108 as described herein may be used to selectively connect a portable device to the CAN bus 74 of the control system 60. By connecting the portable device to the engine emission system port 88, the portable device 90 is directly connected to the CAN bus 74 like a module of the control system 60. As a result, the portable device 90 is able not only to access the data in real time, but also to acquire substantially more data than would otherwise be attainable if a different type of connect, such as a universal serial bus (USB) for example, were used. Further, because the data can be accessed in real time, the use of a CAN recorder and the corresponding delay in processing associated therewith is not necessary.

In an embodiment, the engine emission system port 88 has a different configuration than the ports configured to connect to and/or receive a connector of the other modules associated with the CAN bus 74. In addition, the engine emission system port 88 may have a configuration that is only capable of receiving a corresponding plug or connector in a specific orientation. As a result, by selecting the second connector 110 to mate with the engine emission system port 88, a mistake proof connection may be formed between the second connector 110 and the CAN bus 74.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
a control system operable to monitor and control operation of at least one component of the transport refrigeration system, the control system including:

an interface bus having a plurality of ports, wherein the plurality of ports includes an engine emission system port and an engine emission system plug is receivable within the engine emission system port to connect an engine emission system to the interface bus; and
at least one module connected to the interface bus via the plurality of ports, the at least one module having a controller therein; and
a portable device directly connectable to the interface bus via an adapter physically connectable to the engine emission port of the interface bus via.

2. The transport refrigeration system of claim 1, wherein the adapter further comprises:
a cable having a first end and a second end; and
a first connector arranged at the first end of the cable and a second connector arranged at the second end of the cable, the first connector being coupled to the portable device.

3. The transport refrigeration system of claim 2, wherein the first connector is one of a nine pin serial male and a nine pin serial female.

4. The transport refrigeration system of claim 1, wherein the second connector is interchangeable with an engine emission system plug and an engine emission system cap.

5. The transport refrigeration system of claim 1, wherein the interface bus is a controller area network bus.

6. The transport refrigeration system of claim 1, wherein the portable device is a controller area network reader.

7. The transport refrigeration system of claim 1, wherein the portable device is a piece of equipment capable of running a diagnostic and/or prognostic software.

* * * * *